Dec. 27, 1966  H. J. REAR  3,294,189
ARTICULATED POWER TRANSMISSION ARRANGEMENT
Filed Jan. 20, 1966  4 Sheets-Sheet 1

INVENTOR.
HUGH J. REAR
BY BUCKHORN, BLORE,
KLARQUIST & SPARKMAN
ATTORNEYS

Dec. 27, 1966  H. J. REAR  3,294,189
ARTICULATED POWER TRANSMISSION ARRANGEMENT
Filed Jan. 20, 1966  4 Sheets-Sheet 2

INVENTOR.
HUGH J. REAR
BY BUCKHORN, BLORE,
KLARQUIST & SPARKMAN
ATTORNEYS

Dec. 27, 1966  H. J. REAR  3,294,189
ARTICULATED POWER TRANSMISSION ARRANGEMENT
Filed Jan. 20, 1966  4 Sheets-Sheet 5
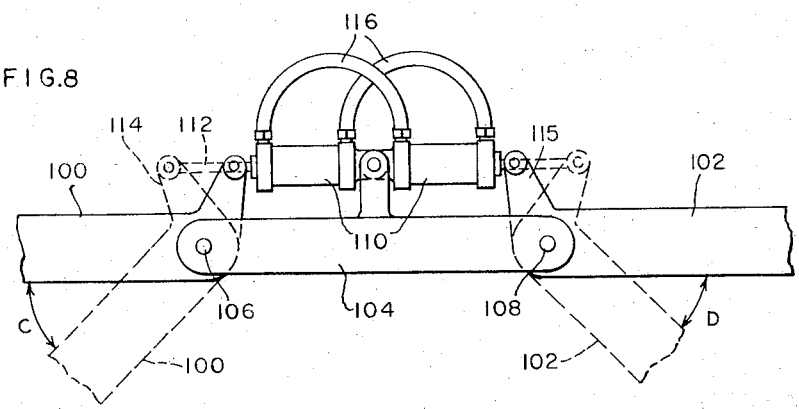
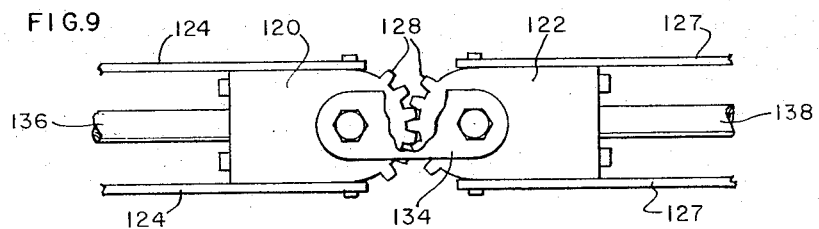
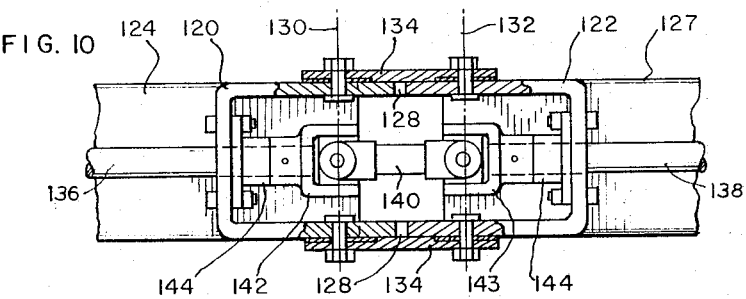
*INVENTOR.*
HUGH J. REAR
BY BUCKHORN, BLORE,
KLARQUIST & SPARKMAN
ATTORNEYS Dec. 27, 1966  H. J. REAR  3,294,189
ARTICULATED POWER TRANSMISSION ARRANGEMENT
Filed Jan. 20, 1966  4 Sheets-Sheet 4
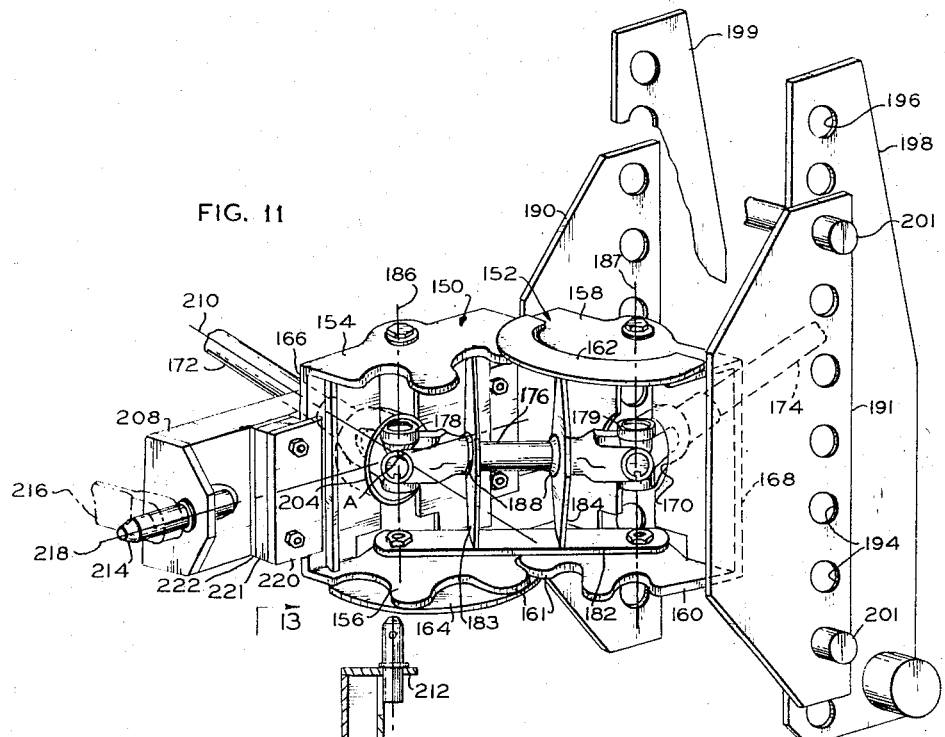
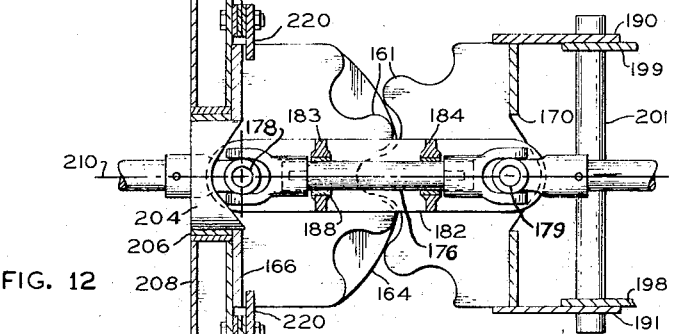
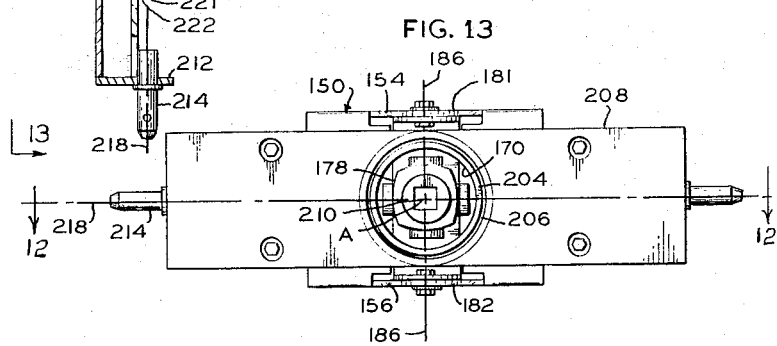
HUGH J. REAR
INVENTOR
BY
BUCKHORN, BLORE, KLARQUIST & SPARKMAN
ATTORNEYS

United States Patent Office 3,294,189
Patented Dec. 27, 1966

3,294,189
ARTICULATED POWER TRANSMISSION
ARRANGEMENT
Hugh J. Rear, 755 River Ave., Eugene, Oreg. 97402
Filed Jan. 20, 1966, Ser. No. 532,492
10 Claims. (Cl. 180—14)

This application is a continuation-in-part of my prior copending application Serial No. 312,235, filed September 27, 1963.

The present invention relates to articulated power transmission arrangements and more particularly to arrangements for transmitting power from a prime mover to a driven machine along a line which may be variable from a straight line drive through a relatively large angle in either direction. The invention has specific application to a combination draft and power connection between a tractor and a trailing implement, although it has other applications as well.

Frequently it is desirable or necessary to transmit power, either rotational or translatory, through a relatively sharp angle. Problems arise as the angle approaches 90 degrees, which problems can be alleviated at least to some extent by distributing the total angle between a number of pivotal connections. In instances where the angle between the driving and driven devices is subject to variation during the operation of such devices, a problem is involved in preventing the turning angle from being taken up by one pivotal connection more than by another.

It is an object of the present invention, therefore, to provide a power transmission arrangement for use between a driving device and a driven device which are subject to considerable variation in their positional relationship, that is, from a straight line drive through a relatively wide angle in either direction in a given plane, the driving arrangement including a connector unit which is pivotally connected at its opposite ends to the driving device and the driven device, respectively, together with means for maintaining substantially equal the angle between the opposite ends of said connector unit and the connected device.

Considering one specific case, it is well known that power can be transmitted by means of a universal joint through an angle, but as the angle is increased the wear upon the joint becomes excessive. In order to transmit power through a large angle such as, for example, 90 degrees, a plurality of universal joints or equivalent means must be provided. In order for such drive arrangements to be successful, the angle between the axes of rotation of the driving element and of the driven element must be distributed between the universal joints. Such drive arrangements as have been devised heretofore have usually required a telescopic connection between the universal joints. Such telescopic connections are subject to numerous other disadvantages, rendering their usage highly undesirable for many applications. Included among these disadvantages are high axial stresses imposed on the universal joints, power loss, lubrication problems and high cost.

It is a further object of the present invention, therefore, to provide a new and improved arrangement for transmitting power from a rotary driving element to a rotary driven element, the axes of rotation of which elements are subject to variation through a relatively large angle extending from zero to approximately 90 degrees in either direction, the driving arrangement including a connector of fixed length between the elements and a simplified arrangement for equalizing the angles between the axis of rotation of each of said elements and that of said connector.

In accordance with the illustrated embodiment, the invention is applied to a power take off and draft connection for use between a tractor and an implement. The drive arrangement in this case includes a driving connector of fixed length connected at its opposite ends by a pair of universal joints to the power take off shaft of the tractor and to the power input shaft of the implement respectively. Means are provided in accordance with various alternative embodiments which additionally interconnect the adjacent ends of the tractor and of the implement, respectively, to equalize the angle of movement in a given plane between the axis of rotation of the power take off shaft and that of the connector with the angle between the connector and the power input shaft of the implement. In addition, a draft connector link is provided between the frame of the tractor and that of the implement, the pivotal connections of the link being vertically aligned with the vertical pivotal axes of the universal joints whereby draft forces between the tractor and the implement are taken up by the link rather than the rotary power connection.

It is a further object of the present invention, therefore, to provide a new and improved power take off and draft arrangement for a prime mover vehicle, such as a tractor having a power take off shaft, and a trailing vehicle, such as an implement having a power input shaft, the axes of the power take off shaft of the tractor being subject to a relatively wide angle of swing relative to the axis of rotation of the power input shaft of the implement, the power connection including a power transmission member of fixed length connected between the output of the tractor and the input shaft of the implement respectively together with simplified angle equalizer means connected between the tractor and the implement adjacent the opposite ends of the power connector, together with a draft linkage for assuming the draft forces between the tractor and the implement.

With respect to many driving devices such as a tractor vehicle and driven devices such as a trailing implement, it is not only necessary to provide for articulation of the power-transmitting elements about a pair of axes normal to each other, but it is also important to provide for articulation of the load-transmitting, or draft, connection between such devices to the same extent about comparable axes. In addition, the load-transmitting connection must frequently be capable of permitting relative twisting movement between the devices about a longitudinal axis extending between such devices. Certain prior arrangements have recognized the foregoing need, but in such arrangements the axis of twisting has been so related to the other pivot axes that the twisting axis would approach a parallel relationship with another of the pivot axes in certain angular positions of operation so that the intended load-transmitting connector between the devices would in fact be incapable of supporting or transmitting the intended load.

Accordingly, another primary object of the invention is to provide a combination rotary power and load-transmitting connection between a driving device and a driven device wherein the load-transmitting connection includes universal joint means which permits angular variation between the devices about a pair of axes normal to each other and transverse to a longitudinal axis between such devices and which also permits relative twisting movement between such devices about such longitudinal axis, with the pair of normal axes and the twisting axis all intersecting at a common imaginary point which coincides with the pivotal center of one of the universal joints of the rotary power-transmitting connection. The load-transmitting connection further incorporates an angle equalizing means which equalizes the angles between the various rotary power-transmitting elements and also equalizes the angles between the various load-transmitting connector elements.

For a consideration of what is believed to be novel and inventive, attention is directed to the following disclosures taken in connection with the accompanying drawings, while the features of novelty will be pointed out with greater particularity in the claims annexed to and forming a part of this disclosure.

In the drawings:

FIG. 8 is a fragmentary plan view illustrating a further modification of the invention;

FIG. 9 is a fragmentary plan view, certain portions being broken away for greater clarity, illustrating a still further modification of the invention;

FIG. 10 is a longitudinal side view, partly in section for purposes of greater clarity, illustrating further the modification shown in FIG. 9;

FIG. 11 is a side perspective view illustrating a modification of the draft and power coupling arrangement of FIGS. 9 and 10 in an angulated condition;

FIG. 12 is a horizontal sectional view of the modification of FIG. 11 taken along the line 12—12 of FIG. 13 showing the relatively pivotable elements in a longitudinally aligned condition; and FIG. 13 is a front elevational view of the FIG. 11 modification taken along the line 13—13 of FIG. 12.

FIG. 1 form

Figure 1:
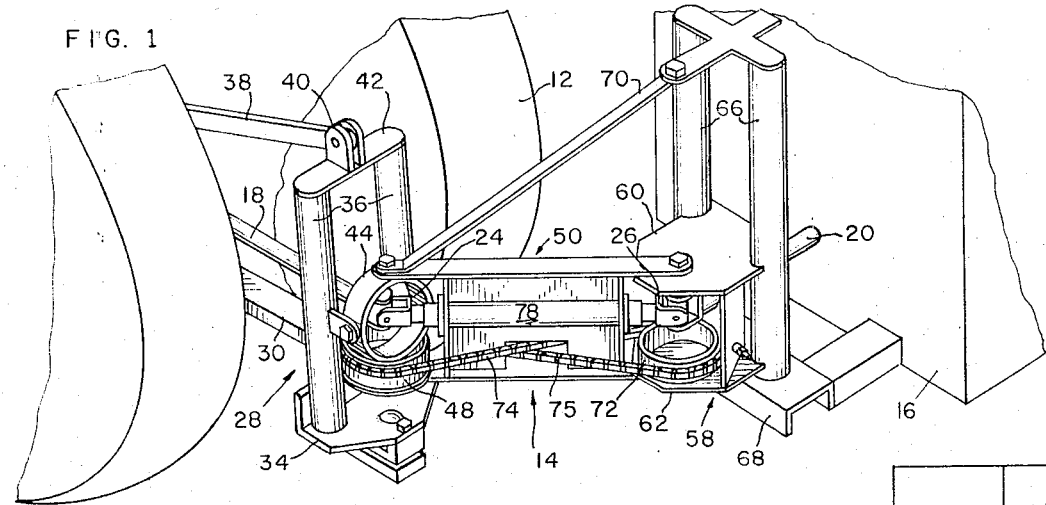
FIG. 1 is a perspective view illustrating a power transmission and draft arrangement constructed in accordance with one form of the present invention.

The invention will first be described with reference to one particular application thereof, namely a power transmission arrangement for connecting a tractor to an implement. With reference to FIG. 1, the rear end portion of a driving device, in this case a tractor 12, is connected by a power transmission arrangement, indicated generally at 14, to the forward end of a driven device, in this case a trailing implement 16, such as an orchard or crop sprayer. The longitudinal axis or normal working direction of the tractor 12 may be represented by the power take off shaft 18 which may also be referred to simply as a rotary driving element. The normal direction of travel of the implement 16 may be referred to for convenience as the longitudinal axis of such implement and may also be represented by the direction of the shaft 20. The shaft 20 also constitutes what may be termed a rotary driven element. The connector 14 includes a power shaft 22 of fixed length connected at opposite ends thereof to the driving and driven shafts by a pair of universal joints 24 and 26, respectively.

Figure 2:
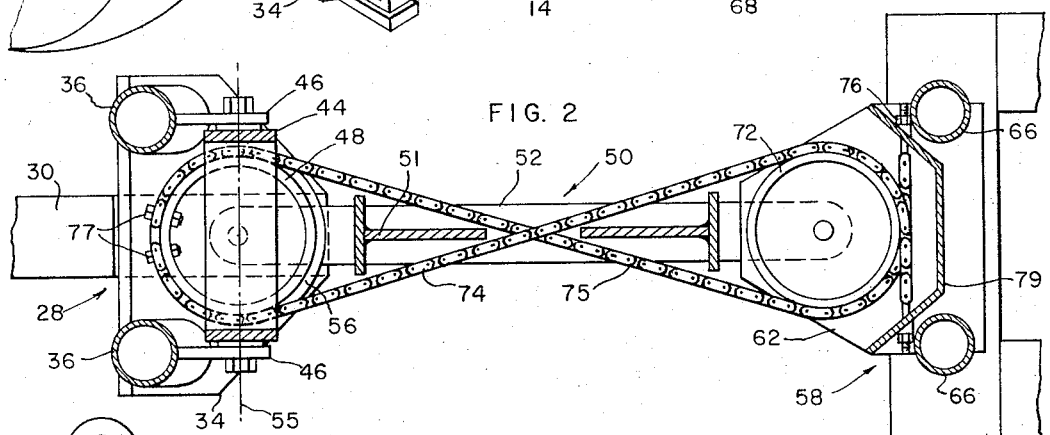
FIG. 2 is a view taken along the line 2—2 of FIG. 3.
Figure 3:
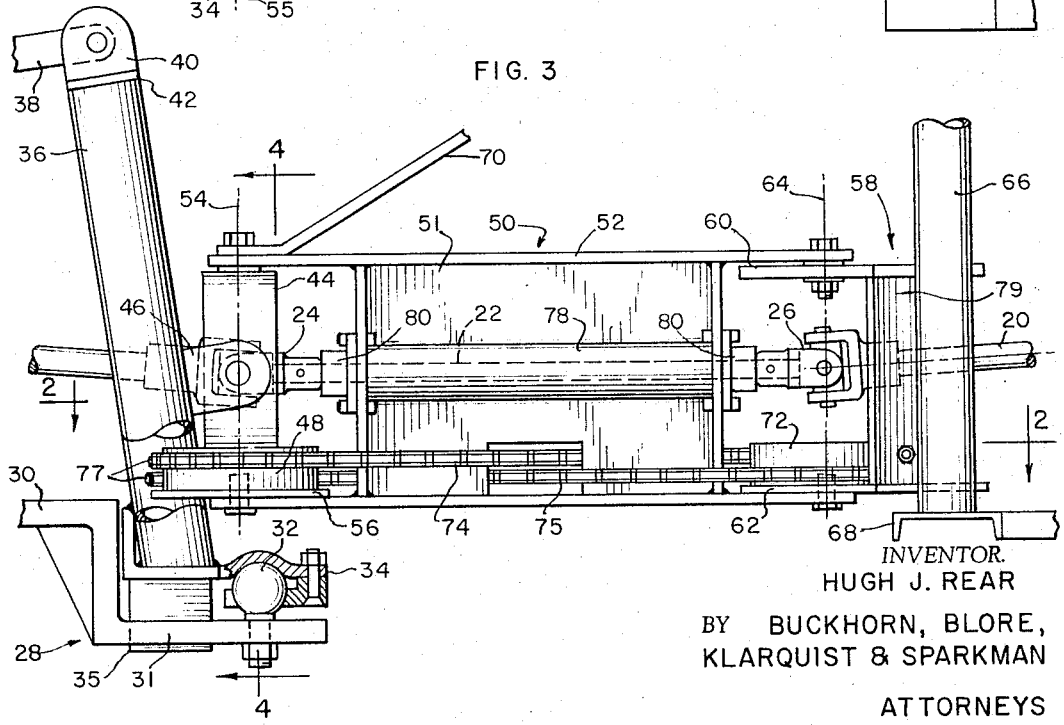
FIG. 3 is an enlarged side elevation of the arrangement illustrated in FIG. 1.
Figure 4:
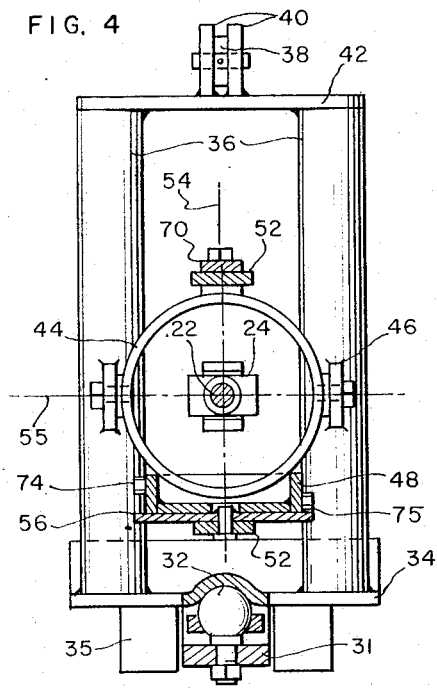
FIG. 4 is a sectional view taken along the line 4—4 of FIG. 3.

As shown in FIGS. 2, 3 and 4, a drawbar structure 28 extends rearwardly from the rear portion of the tractor and includes a drawbar member 30 including a downwardly displaced rear portion 31 connected by a ball-and-socket joint 32 to a base plate 34. A pair of downwardly extending flanges 35 of the base plate positioned on opposite sides of the drawbar portion 31 prevent rotation of the drawbar and base plate in a horizontal plane. The ball-and-socket connection permits limited relative torsional movement between the tractor and implement.

The base plate 34 supports a pair of upright masts 36, which are further supported at their upper ends by a strap 38 which slopes upwardly and rearwardly from the tractor and is loosely mounted at its outer end between a pair of upstanding ears 40 on a cross brace 42 joining the masts. A ring member 44 is suspended from a pair of mounting ears 46, one on each mast 36, for rotation about a generally horizontal axis through the center of the ring. Welded to the lower portion of the ring for movement horizontally with the tractor and drawbar structure is a horizontally disposed drum 48 which serves as a part of the angle control means for the draft connection and implement in a manner to be described hereinbelow.

A draft member 50, generally of I-beam construction, includes a central web portion 51 and upper and lower flange portions 52 which are pivotally connected at their forward ends to the top of the ring 44 and central base of the drum 48 respectively, whereby the draft member 50 and tractor are relatively pivotal about a forward vertical axis 54 which passes through the center of the ring and the axis of the drum 48. A bearing plate 56 is interposed between the drum and lower flange 52. Also, the tractor and its drawbar elements are pivotal relative to the draft member 50 and trailing implement supported by the draft member, about a horizontal axis of rotation 55 of the ring member 44.

The rear end of the draft unit 50 is pivotally connected to the forward end 58 of the implement and more specifically, the upper and lower flanges 52 of the draft unit are pinned to upper and lower plates 60 and 62, respectively, for pivotal movement about a second, rear vertical axis 64. The upper and lower plates are rigidly affixed to a pair of rear support masts 66 mounted on a forward extension of the implement frame 68. A rear drum 72 of the same diameter as the drum 48 is rigidly mounted on the lower plate 62 in a position such that the rear vertical pivotal axis 64 passes through the center of the drum. A diagonal brace 70 extends from a cross piece joining the upper ends of the rear masts 66 to the pivotal connection at the top of the ring member 44 and serves to relieve the rear pivotal connection of the draft unit of some of the bending stresses that would otherwise be induced at that point so as to restrict rotatability.

A belt, composed of two disconnected chain segments 74 and 75, extends between the two drums 48 and 72 and is trained about each one so that the belt transfers rotative motion of one drum to the other thereof. More particularly, one chain segment 74 is spaced above the other segment 75 on the drums whereby the segments cross one another midway between the drums without interference. Each segment is wrapped at least partially around each drum, and one end of each such segment is rigidly affixed to the front drum 48 by suitable fastening means such as the nuts and bolts 77. The opposite end of each segment is adjustably bolted as at 76 to an upright wall 79 extending between the upper and lower plates 60 and 62.

The intermediate power shaft 22 extends through a longitudinally extending tubular portion 78 of the draft unit 50 mounted midway between the flanges 52 of the draft unit, and is supported by bearings 80 at both ends of the tubular member. The universal joints 24 and 26 at either end of the shaft 22 are so positioned that the forward and rear axes 54 and 64 pass one through the center of rotation of each universal joint. As shown most clearly in FIG. 4, the front universal joint 24 is also positioned centrally of the ring 44 so that the horizontal pivotal axis of rotation 55 of such ring passes through the center of rotation of such universal joint. The effect of this arrangement is that the draft elements and power shaft elements have concentric universal connections whereby the draft member and power shaft rotate about common horizontal and vertical axes relative to the tractor. Thus, the distance between universal joints remains constant through both horizontal and vertical articulation of the tractor relative to the implement, and the power shaft 22, therefore, may be a fixed length member rather than a telescopic unit as is required in prior art drive arrangements.

Figure 5:
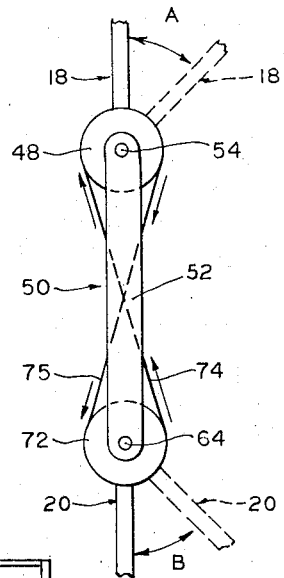
FIG. 5 is a diagrammatic view illustrating a principle of operation of the drive arrangement illustrated in FIGS. 1 to 4 inclusive.

A further disadvantage of the foregoing relationship is that the included angle between shafts 18 and 22 at the forward universal joint equals the included angle between power shafts 22 and 20 at the rear universal joint 26 throughout the course of a turn and regardless of the angular relationship between tractor and implement. Consequently, the driving and driven shafts can be operated at a constant speed throughout all phases of a turn. Moreover, the angles between power shafts at the universal joints have a value only one half that of the angle between longitudinal axes of the tractor and implement. In other words, by reference to the diagrammatic view of FIG. 5, it will be observed that the angle A between the axis of the driving device, represented by shaft 18 and the axis of the connector unit 50 is always maintained substantially equal to the angle B between the axis of the driven device represented by shaft 20. Angle A plus B equals the total included angle between the axes of the driving and driven devices. Thus, with the longitudinal axis of the tractor disposed at an angle of 90 degrees with respect to the same axis of the implement the shaft angles at the universal joints are only 45 degrees each, thereby enabling operation of the power shafts at full torque during very small radius turns, resulting in increased operating efficiency.

Figure 6:
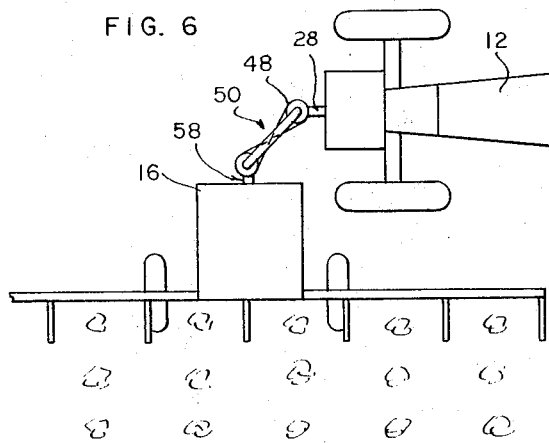
FIGS. 6 and 7 are diagrammatic views illustrating certain operational characteristics of the draft arrangement illustrated in FIGS. 1 to 4 inclusive.
Figure 7:
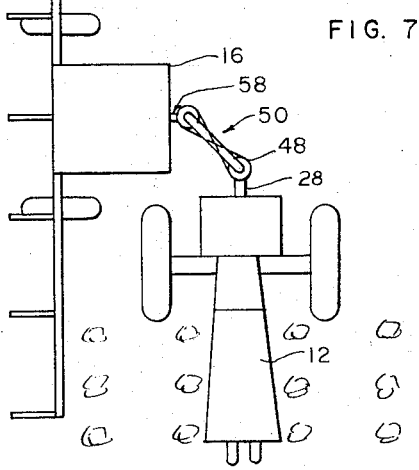

From the foregoing description, it will be obvious that the drums 48 and 72, attached to the ends of the driving and driven devices respectively, in combination with the interconnecting chains 74 and 75 constitute a pair of interconnected angle-equalizing means of general utility. For example, such angle-equalizing means is useful and advantageous not only with respect to facilitating transmission of rotational power through the shafts 18, 22 and 20, but is also useful in connection with the transmission of translatory power from the tractor hitch 28 through the draft link 52 to the implement hitch 58. The utility and advantage of such an angle-equalizing arrangement in connection with a simple draft connection is illustrated diagrammatically in FIGS. 6 and 7 wherein is illustrated a tractor 12 connected to an agricultural sprayer implement 16. The draft arrangement as illustrated facilitates better tracking of the implement behind the tractor even when making relatively sharp turns at the ends of the crop rows. The connector unit, including the angle-equalizing means as described, serves as an automatically compensating extension of the tractor drawbar to cause the implement 16 to track along the arc drawn by the tractor.

FIG. 8 form

It will be obvious from the foregoing description that other forms of angle-equalizing means may be substituted for the drum-and-chain arrangement previously described. For example, in FIG. 8 is illustrated diagrammatically a further modification of an angle-equalizing arrangement in which the interconnection between the end of the driving device and the adjacent end of the driven device is accomplished through the means of fluid pressure cylinders and levers. In this case, the rear hitch device or tractor is represented at 100 while the forward hitch of the driven device or implement is represented at 102, which are connected together by a connector link member 104 at pivots 106 and 108. A pair of cylinders 110 are mounted upon the link member 104 and have piston rods 112 connected to the ends of the lever arms 114 and 115 respectively, extending outwardly from the hitches 100 and 102 respectively. The opposed ends of the hydraulic cylinders 110 are cross connected by conduits 116. It will be obvious that any angular movement of one of the hitches 100, 102 with respect to the connector 104 will result in a corresponding angular movement of the other hitch with respect to the connector 104. Accordingly, the angle C will at all times be maintained equal to the angle D. If desired for purposes of clarity, the rotational drive connection comparable to the shaft and universal joint arrangement shown in the previous modification may be incorporated with the angle-equalizing arrangement shown in FIG. 8.

FIG. 9 form

In FIGS. 9 and 10 are illustrated a still further modification of the invention. In this instance, the hitch of the driving device may be represented by a pair of bracket arms 124 while the hitch of the driven device may be represented by a pair of bracket arms 127. The hitches are connected together by a pair of connector links 134 pivotally secured by bolts extending along the pivotal axes 130 and 132 respectively and secured to the upper and lower flanges of U-shaped members 120 and 122. The members 120 and 122 are rigidly secured to the hitch bracket arms 124 and 127, respectively. The angle-equalizing means incorporated in the modification of FIGS. 9 and 10 include the arcuate ends of the upper and lower flanges of the U-shaped members 120 and 122 which extend toward each other and which arcuate ends are provided with cooperating and intermeshing teeth 128. The teeth 128 therefore constitute the interconnection of the angle-equalizing means mounted on the ends of the driving device and driven device, respectively. Driving and driven shafts are also shown which are interconnected by shaft 140 and universal joints 142 and 143, the axes of which are aligned with the pivotal axes 130 and 132 respectively. The shafts 136 and 138 are further journaled as at 144 in the ends of the U-shaped members 120 and 122, respectively. It will be obvious that any angular movement of one hitch 124 or 127 with respect to the connector 134 will be accompanied by a similar angular movement between such connector and the other hitch in substantially the same manner as previously described in connection with the modification of FIGS. 1 to 5 inclusive and of FIG. 8. Moreover, the total angle of movement between the axes of the shafts 136 and 138 will be equally divided between the two universal joints 142 and 143. The interconnector shaft 140 is of fixed length and is entirely relieved of axial stresses by the connector links 134.

FIG. 11 form

FIGS. 11 through 13 illustrate a further modification of the invention similar to the FIG. 9 form but having an improved and more complete hitch arrangement than that of the latter. Such arrangement includes generally U-shaped front and rear angle-equalizing members 150 and 152. The front such member includes upper and lower gear segment plates 154, 156, and the rear such member includes corresponding gear segment plates 158, 160, with the gear teeth 161 of the corresponding plates of each member intermeshing. Upper plate 158 of the rear member carries an arcuate lip 162 which overlaps the gear teeth on upper plate 154 of the front member, and lower plate 156 of the front member carries a similar lower lip 164 extending beneath the gear teeth of lower rear plate 160 so as to maintain vertical alignment between the intermeshed gear segments.

The upper and lower gear segment plates of the front and rear equalizing members are joined by vertical backing plates 166, 168, respectively. Both backing plates have a central opening 170 through which the rotary power transmission elements extend. These elements include an output shaft 172 of a tractor (not shown) and an input shaft 174 of a trailing implement (not shown) connected together by an intermediate transmission shaft 176 of fixed length and a pair of universal joints 178, 179 at either end of shaft 176 and centered within the openings 170.

A rigid connector member composed of upper and lower connector links 181, 182, joined together by upright struts 183, 184 pivotally connect together the front and rear equalizer members at pivot points which lie on a pair of longitudinally spaced vertical pivot axes 186, 187. These pivot axes also pass through the centers of curvature of the arcuate gear segment plates of the two equalizer members and through the pivotal centers of the universal joints 178, 179. A bearing 188 on each of struts 183, 184 rotatably supports transmission shaft 176 in a substantially horizontal position between the two connector links.

A pair of upright side plates 190, 191 are rigidly affixed to the opposite sides of rear equalizer member 152. The rear edge portion of each such side plate has a row of vertically aligned openings 194 which are adapted to register with like opening 196 along the front edge of a pair of upright trailer members 198, 199 rigidly carried by the trailer implement. Attaching pins 201 extending through selected ones of the aligned openings rigidly connect the hitch coupling to the trailer implement. The foregoing-described connecting plates provide a means of connecting the coupling to the trailer at different levels of adjustment so that the three power shafts can be placed initially in approximately horizontal positions for optimum performance.

The center opening in backing plate 166 of the front equalizer member carries a sleeve bearing 204 which projects forwardly into sliding engagement with a bushing 206 lining a center opening of a cross hitch member 208 to provide for relative rotation between the cross member and the front equalizer member about a longitudinal rotational axis 210. The opposite ends of cross member 208 have rearwardly projecting flanges 212, each of which carries a pivot pin 214. The rear ends of a pair of tractor draft bars 216 are adapted to be attached to pins 214 in the manner shown in FIG. 11, so that relative vertical hinging movement between the tractor and trailer is provided about a generally horizontal transverse axis 218 through the pins.

Axial forces are transmitted between the front equalizer member and the cross hitch member by a pair of thrust members 220 which are attached by bolts to the cross member and bear against the rear face of backing plate 166. Spacer plates 221, 222 provide the necessary separation between the thrust plate and the cross member.

It will be apparent from FIGS. 11 through 13 that relative vertical movement between the tractor and trailer is provided by transverse axis 218, whereas horizontal pivoting movement between the same will occur equally about spaced vertical axes 186 and 187. Furthermore, relative twisting of the tractor and trailer can occur about longitudinal axis 210. More importantly, however, vertical axis 186, transverse axis 218 and longitudinal axis 210 meet at a common point A in all positions of articulation of tractor and trailer, and point A is also the center of rotation of the front universal joint 178 of the power transmission. The significance of this arrangement of pivotal axes is that the longitudinal twisting axis 210 and transverse axis 218 always remain at right angles to one another, regardless of the angular relation of tractor and trailer. Thus, because these two axes cannot approach parallelism with one another, the coupling will always support the trailer on the tractor and will transmit, without sagging, a portion of the load of the former to the latter. On the other hand, the coupling provides, in a simplified arrangement, for all the necessary articulation between tractor and trailer while at the same time dividing equally the angles between power shafts in a horizontal plane and eliminating the need for a telescoping power connection.

It should be appreciated that although the above-described transverse and longitudinal hinge axes pass through the center of the front universal joint, the same could, if desired, be arranged instead to pass through the center of the rear universal joint merely by reversing the coupling with respect to the tractor and trailer.

Having illustrated and described several preferred embodiments of the invention, it should be apparent to those skilled in the art that the invention permits of further modification in arrangement and in specific details. I claim as my invention all such modifications as fall within the true spirit and scope of the appended claims.

I claim:

1. An articulated coupling for connecting together a tractor vehicle and a trailer vehicle comprising:
   a draft connector link extending between said vehicles and pivotally connected to one of said vehicles for articulation about a first upright hinge axis,
   universal joint means connecting said connector link to the other said vehicle so as to permit relative articulation between said link and said other vehicle about a second upright hinge axis and about a generally horizontal transverse hinge axis,
   said universal joint means including means providing for relative twisting movement between said vehicles about a longitudinal axis,
   and angle equalizer means in association with said connector means for maintaining the angular variation between one said vehicle and said conductor link substantially equal to the angular variation between the other said vehicle and said connector link,
   said second upright hinge axis, said transverse hinge axis and said longitudinal twisting axis all intersecting at a common imaginary point in all positions of relative articulation of said vehicles whereby said coupling is capable of transmitting both axial and load forces between said vehicles in all positions of articulation thereof.

2. An articulated power and draft connection between a tractor vehicle and a trailer vehicle comprising:
   a rotary power output element extending rearwardly from said tractor vehicle,
   a rotary power input element extending forwardly from said trailer vehicle,
   a rotary power transmission connector member extending between said elements,
   a pair of universal joints, one connecting each of the opposite ends of said power transmission member to adjacent ends of said elements,
   draft connector means pivotally interconnecting said tractor vehicle and said trailer vehicle so as to permit relative articulation of said vehicles about a pair of longitudinally spaced-apart upright hinge axes and a generally horizontal transverse hinge axis,
   said draft connector means including angle control means for maintaining the angle between said output element and said transmission member substantially equal to the angle between said transmission member and said input element in all positions of articulation between said vehicles,
   swivel means interconnecting said draft connector means and one of said vehicles so as to permit relative twisting movement between said vehicles about a longitudinal axis,
   said upright hinge axes passing one through the pivotal center of each said universal joint,
   one of said upright hinge axes, said transverse hinge axis and said longitudinal twisting axis all intersecting at a common imaginary point, with said point being coincident with the pivotal center of one of said universal joints in all positions of articulation between said vehicles.

3. An articulated power transmission arrangement for use between a driving device including a rotary driving element and a driven device including a rotary driven element, the axes of said elements being angularly variable with respect to each other in a given plane, said devices being angularly variable relative to each other in said given plane and in a plane normal to said given plane and also being capable of twisting movement about a longitudinal axis with respect to each other, said arrangement comprising:
   a power-transmitting connector member of fixed length,
   a pair of universal joints connecting the opposite ends of said connector member to the adjacent ends of said driving and driven elements, coupling means interconnecting said devices for transmitting longitudinal forces between said devices, said coupling means including angle control means for maintaining the angle between said connector member and the axis of each of said elements equal to substantially one-half the total angle between the axes of said elements, said coupling means including a third universal joint means permitting relative hinging movement between said devices about a transverse hinge axis in said given plane and about a hinge axis normal to said transverse axis and to said given plane, said third universal joint means also permitting relative twisting movement between said devices about said longitudinal axis, said transverse hinge axis, said normal hinge axis and said longitudinal twisting axis all intersecting at a common imaginary point coincident with the pivotal center of one of said pair of universal joints connecting said transmission member to one of said elements in all angular positions of said devices.

4. An arrangement according to claim 3 wherein said coupling means also permits relative hinging movement between said devices about a hinge axis parallel to said normal hinge axis and passing through the pivotal center of the other of said pair of universal joints and wherein said transverse hinge axis is normal to said longitudinal twisting axis in all angular positions of said devices.

5. An arrangement according to claim 2 wherein said angle control means includes a first drum member on said tractor vehicle and a second drum member on said trailer vehicle and a belt means extending between and operatively engaging said drum members.

6. An arrangement according to claim 2 wherein said angle control means includes a first gear means having teeth arranged along an arcuate path, the center of which coincides with one of said upright hinge axes, and second gear means having gear teeth intermeshing with the gear teeth of said first gear means and arranged along an arcuate path, the center of which coincides with the other said upright hinge axis.

7. An arrangement according to claim 6 wherein said first gear means includes a pair of gear segments spaced apart vertically one above the other and wherein said second gear means includes a second pair of gear segments spaced apart vertically one above the other and intermeshing with said first pair of gear segments, said transmission member being of fixed length and passing longitudinally between said upper and lower gear segments, a rigid, upright plate member connecting together the upper and lower gear segments of one said gear means, a laterally extending cross hitch member including means for hingedly connecting said laterally extending member to said tractor vehicle so as to permit relative hinging between said tractor vehicle and said cross hitch member about said transverse hinge axis, and bearing means pivotally connecting said upright plate to said cross hitch member so as to permit relative twisting movement between said plate and said hitch member about said longitudinal twisting axis.

8. An arrangement according to claim 6 including means for rigidly connecting one of said gear means to one of said vehicles, said rigid connecting means including vertically adjustable means permitting the attachment of said coupling means to said one vehicle at a level such that said output element, said input element and said transmission member can all be disposed substantially horizontally upon coupling said vehicles together.

9. An arrangement according to claim 7 wherein the upper gear segment of one gear means includes a first lip means overlapping the upper gear segment of the second gear means and wherein the lower gear segment of said second gear means includes a second lip means overlapping the lower gear segment of said one gear means so as to maintain the teeth of said mating gear segments in mesh in all positions of articulation of said vehicles.

10. An arrangement according to claim 2 wherein said one upright hinge axis, said transverse hinge axis and said longitudinal twisting axis pass through the pivotal center of the forward one of said pair of universal joints.

References Cited by the Examiner

UNITED STATES PATENTS

| 2,139,963 | 12/1938 | Leason | 180—14 |
| 2,862,568 | 12/1958 | Koch | 180—14 |

FOREIGN PATENTS

| 441,480 | 1/1936 | Great Britain. |

BENJAMIN HERSH, *Primary Examiner.*

C. C. PARSONS, *Assistant Examiner.*